United States Patent

Lin

[11] Patent Number: 5,842,315
[45] Date of Patent: Dec. 1, 1998

[54] CORRUGATED BOARD STRUCTURE

[75] Inventor: Gary Lin, Taipei, Taiwan

[73] Assignees: Tung Yik Trading Co., Ltd.; Tienchi Trading Co., Ltd., both of Taipei, Taiwan

[21] Appl. No.: 823,387

[22] Filed: Mar. 24, 1997

[51] Int. Cl.⁶ .............................. E04C 2/284; B32B 3/00
[52] U.S. Cl. ................ 52/309.9; 52/309.14; 52/630; 52/783.11; 52/792.1; 52/794.1; 428/127; 428/130; 428/178; 428/182; 428/192
[58] Field of Search ................ 52/309.4, 309.5, 52/309.9, 309.14, 630, 783.11, 783.19, 792.1, 794.1; 428/122, 127, 130, 178, 182, 192

[56] References Cited

U.S. PATENT DOCUMENTS

| | | | |
|---|---|---|---|
| 2,913,075 | 11/1959 | Zittle | 52/783.11 X |
| 3,062,337 | 11/1962 | Zittle | 52/783.11 X |
| 3,535,844 | 10/1970 | Glaros | 52/309.9 X |
| 3,555,756 | 1/1971 | Curran et al. | 52/309.9 X |
| 3,583,123 | 6/1971 | Holmgren et al. | 52/309.5 X |
| 3,733,232 | 5/1973 | Payne | 52/309.5 X |
| 3,846,054 | 11/1974 | Davis | 52/309.5 X |
| 4,206,267 | 6/1980 | Jungbluth | 52/309.14 X |
| 5,299,405 | 4/1994 | Thompson | 52/630 X |
| 5,612,111 | 3/1997 | Lin | 52/309.9 X |

*Primary Examiner*—Carl D. Friedman
*Assistant Examiner*—Kevin D. Wilkens
*Attorney, Agent, or Firm*—Bacon & Thomas

[57] ABSTRACT

A corrugated board structure including an upper layer of corrugated board, a bottom film and a middle layer of PU foam. Each side of the bottom PVC film is formed with an inward bent upright folded wall which, during the foaming and expansion procedure of the PU foam, restricts the foaming space so as to continuously produce solid foam structure. The middle PU foam makes the upper and lower layers tightly adhered to each other as an integral body. An edge of the projection on one side and an edge of one of the front and rear ends is free from any PU foam and bottom film so that two adjacent corrugated boards can be overlaid and connected.

3 Claims, 7 Drawing Sheets

CORRUGATED BOARD STRUCTURE

BACKGROUND OF THE INVENTION

The present invention relates to a corrugated board structure.

FIG. 1 shows a conventional corrugated board for constructing the roof or outer wall of a factory or a warehouse. Such corrugated board includes three layers, that is, an upper corrugated layer 1, a middle PU foam layer 10 and a lower metal sheet 11 or plastic sheet. The middle PU foam layer 10 makes the upper and lower layers 1, 11 tightly adhered to each other. The lower side of one edge of the corrugated layer is free from any foam layer 10 so as to connect the corrugated board with an adjacent one. Such corrugated board is manufactured with low production efficiency. Moreover, the product has a fixed specification of length so that it is difficult to assemble the corrugated board. This leads to difficulty in working.

SUMMARY OF THE INVENTION

It is therefore a primary object of the present invention to provide a corrugated board structure including an upper layer of corrugated board, a bottom film and a middle layer of PU foam sandwiched therebetween. Each side of the bottom PVC film is formed with an inward bent upright folded wall to to restrict the foaming space of the PU foam. The middle PU foam makes the upper and lower layers tightly adhered to each other as an integral body.

It is a further object of the present invention to provide the above corrugated board structure in which the flute is formed with a U-shaped projection to reinforce the corrugated board.

It is still a further object of the present invention to provide the above corrugated board structure in which the lower edge of the projection of corrugated board on one side and the lower edge of one of the front and rear ends is free from any PU foam and bottom film so that two adjacent corrugated boards can be overlaid and connected.

The present invention can be best understood through the following description and accompanying drawings, wherein:

DETAILED DESCRIPTION OF THE PREFERRED EMBODIMENTS

Figure 1:
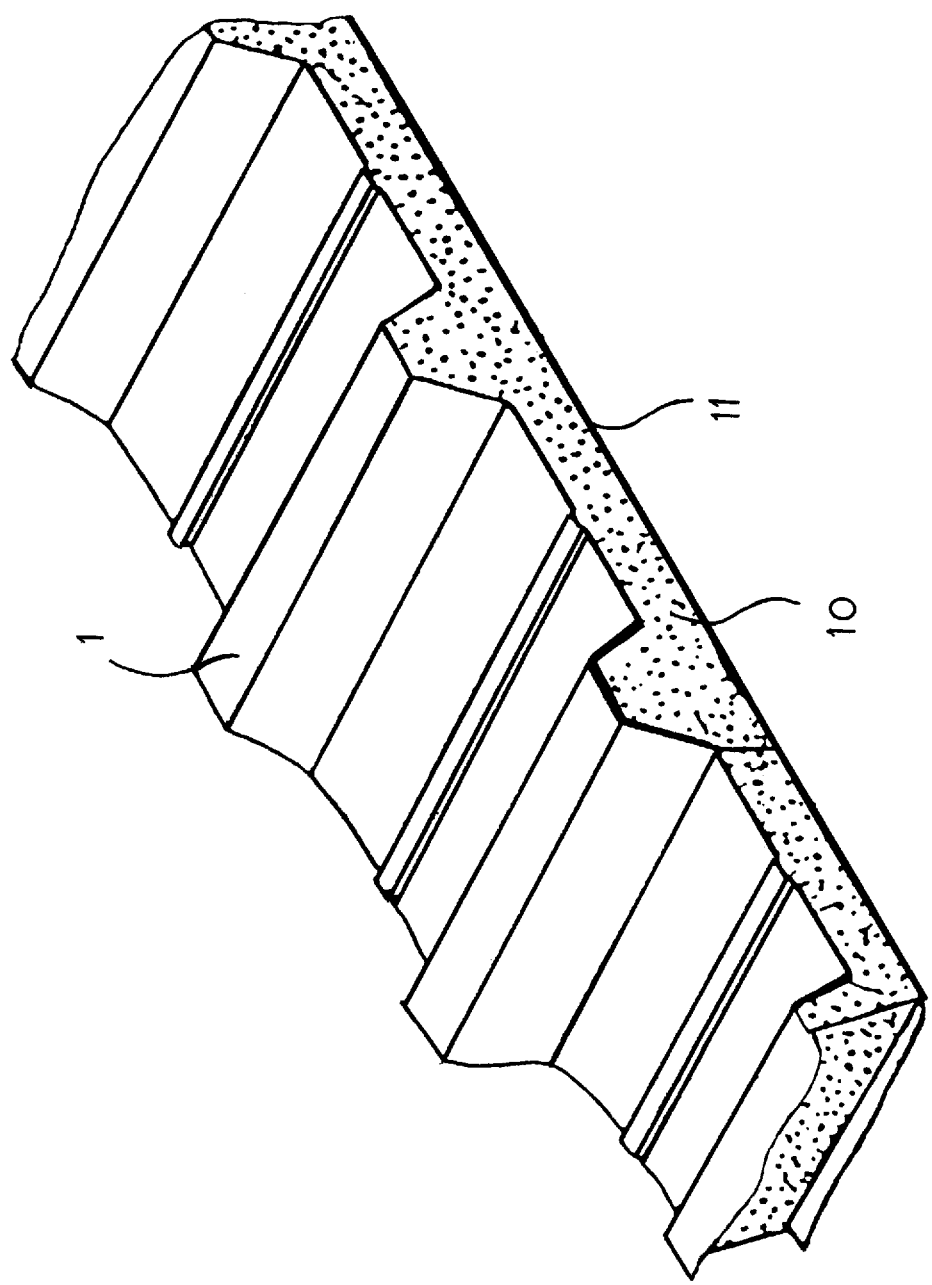
FIG. 1 is a perspective view of a conventional corrugated board.
Figure 2:
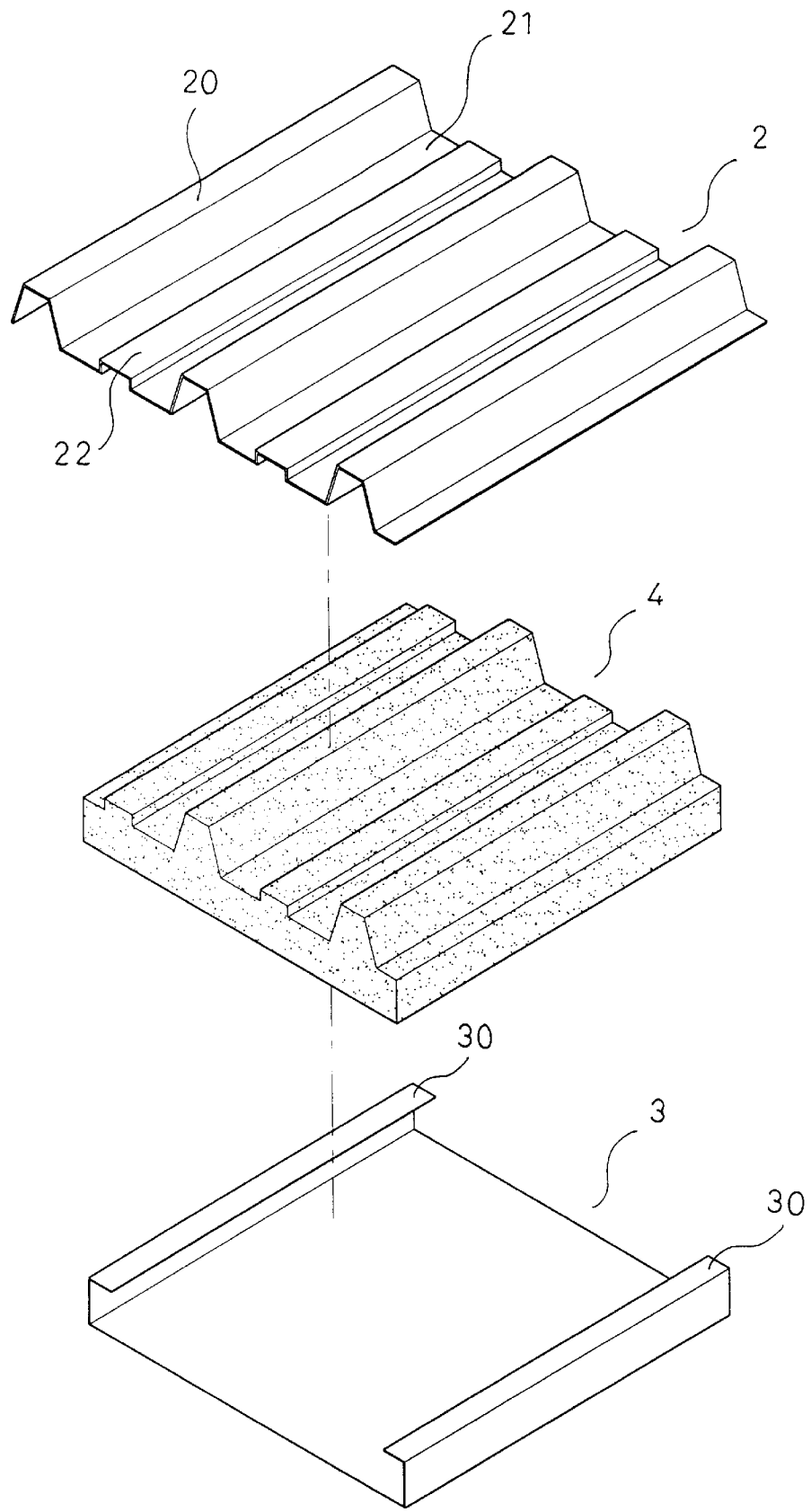
FIG. 2 is a perspective exploded view of the corrugated board of the present invention.

Referring to FIG. 2, the corrugated board structure of the present invention includes an upper layer of corrugated board 2 formed by polyvinylchloride (PVC), polycarbonate (PC), polypropylene (PP) film or steel sheet, a bottom layer of PVC film 3, PP film, nylon film or wooden fiber skin and a middle layer of PU foam 4.

Figure 8:
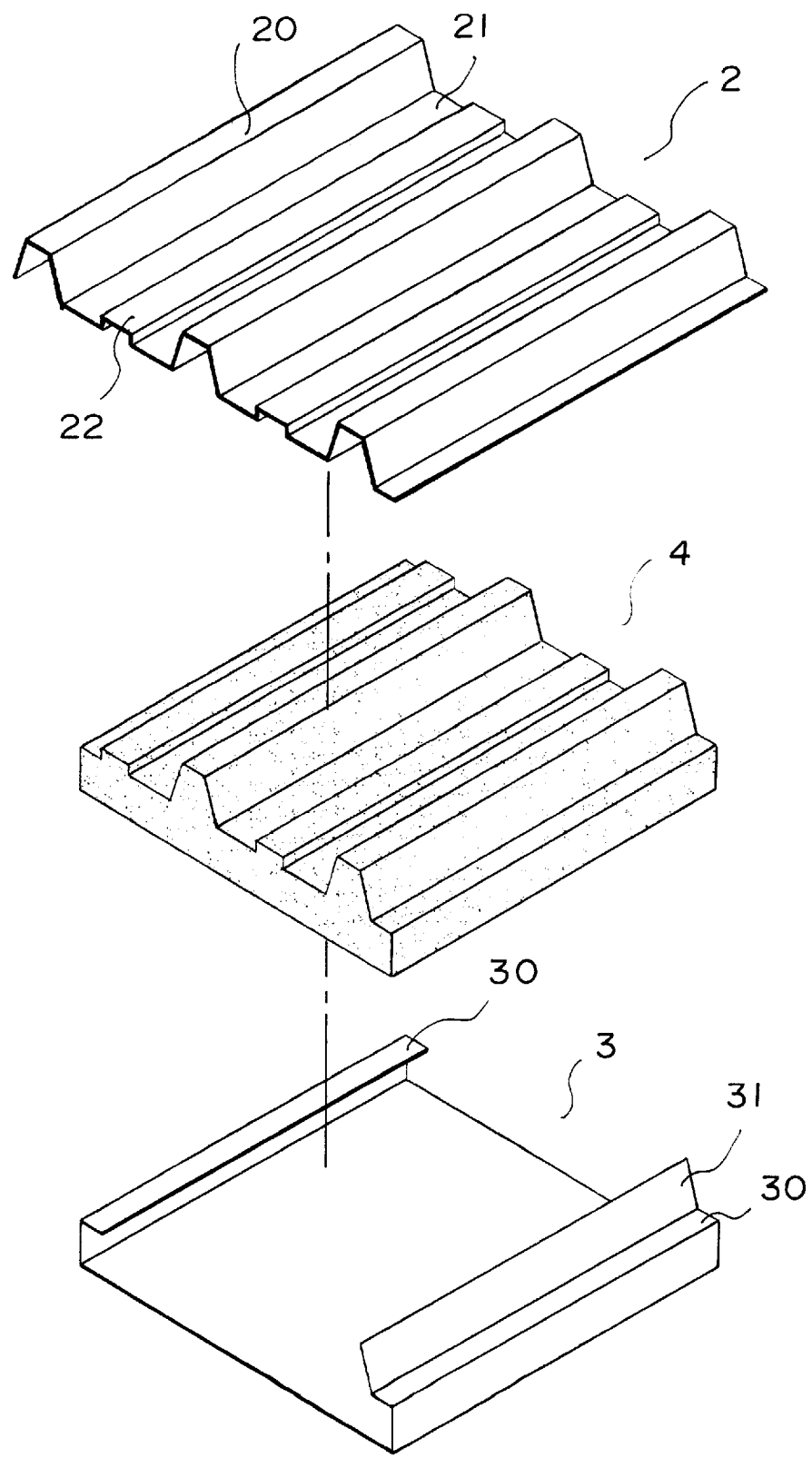
FIG. 8 is a perspective exploded view of another embodiment of the corrugated board of the present invention.

The upper corrugated board 2 is formed with trapezoid projections 20 defining flutes 21. Each flute 21 is formed with a U-shaped projection 22. Each side of the bottom PVC film 3 is formed with an inward bent upright folded wall 30. During the foaming and expansion procedure of the PU foam 4, the upright folded walls 30 serve to restrict the foaming space thereof. Therefore, the PU foam 4 can fully make the upper corrugated board 2 and the bottom PVC film 3 tightly adhered to each other as an integral body. Referring to FIG. 8, the upright folded wall 30 of the bottom PVC film 3 can be designed with an inclined side 31 extending from the top of the folded wall 30.

Figure 3:
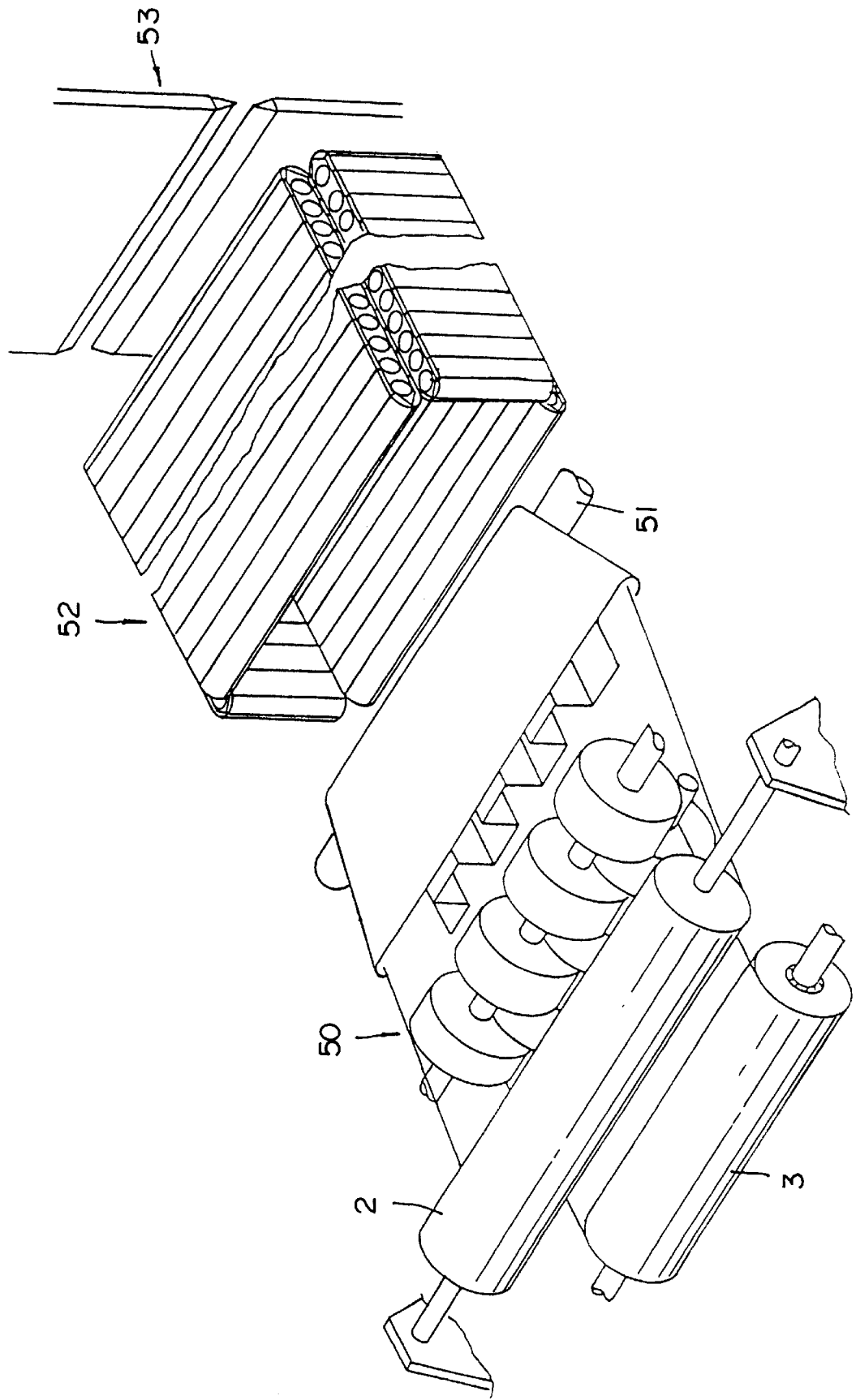
FIG. 3 shows the manufacturing procedure of the corrugated board of the present invention.

Referring to FIG. 3, the corrugated board of the present invention is manufactured by a foam corrugated board forming machine in a continuous foaming manner, The machine is disposed with two reels of upper layer of corrugated board 2 and bottom PVC film 3 on a front side. After forming by the pressing rollers 50, the upper layer of corrugated board 2 and the bottom PVC film 3 are conveyed by a conveying belt through a foam material spraying tube 51 which sprays PU foam material thereonto. Thereafter, the corrugated board 2 and the PVC film 3 are fed into a foaming room 52 for foaming. Finally, a cutting machine 53 cuts the corrugated board into a preset length.

Figure 4:
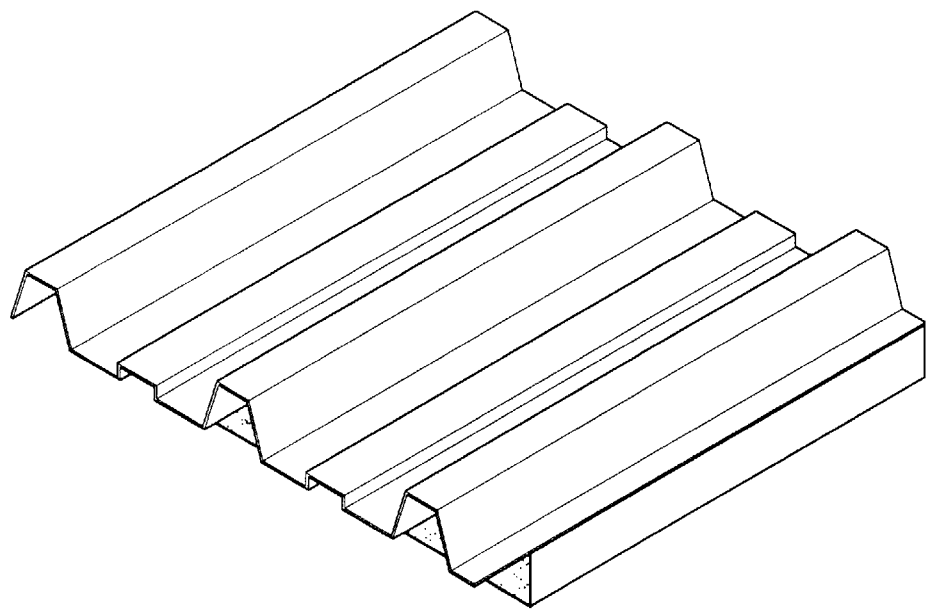
FIG. 4 is a top perspective view of the corrugated board of the present invention.
Figure 5:
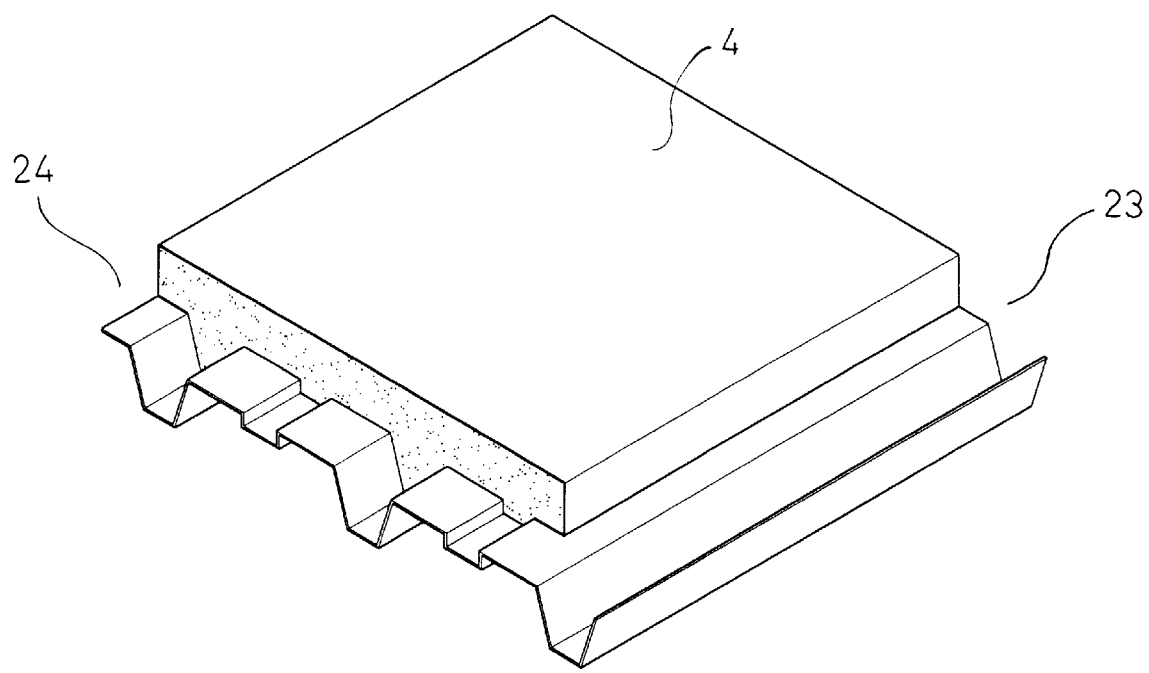
FIG. 5 is a bottom perspective view of the corrugated board of the present invention.
Figure 6:
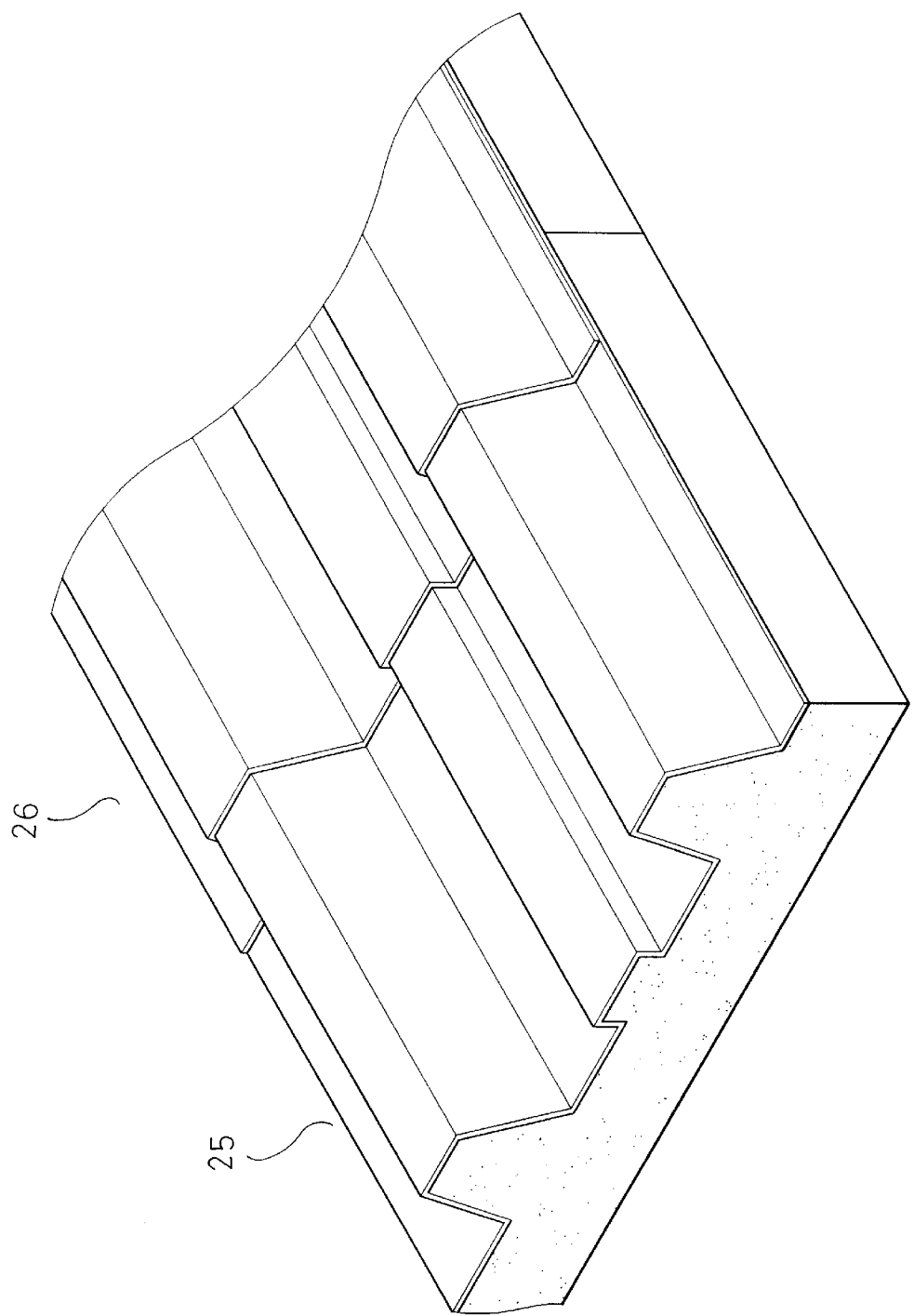
FIG. 6 is a perspective view showing the longitudinal connection of the corrugated board of the present invention.
Figure 7:
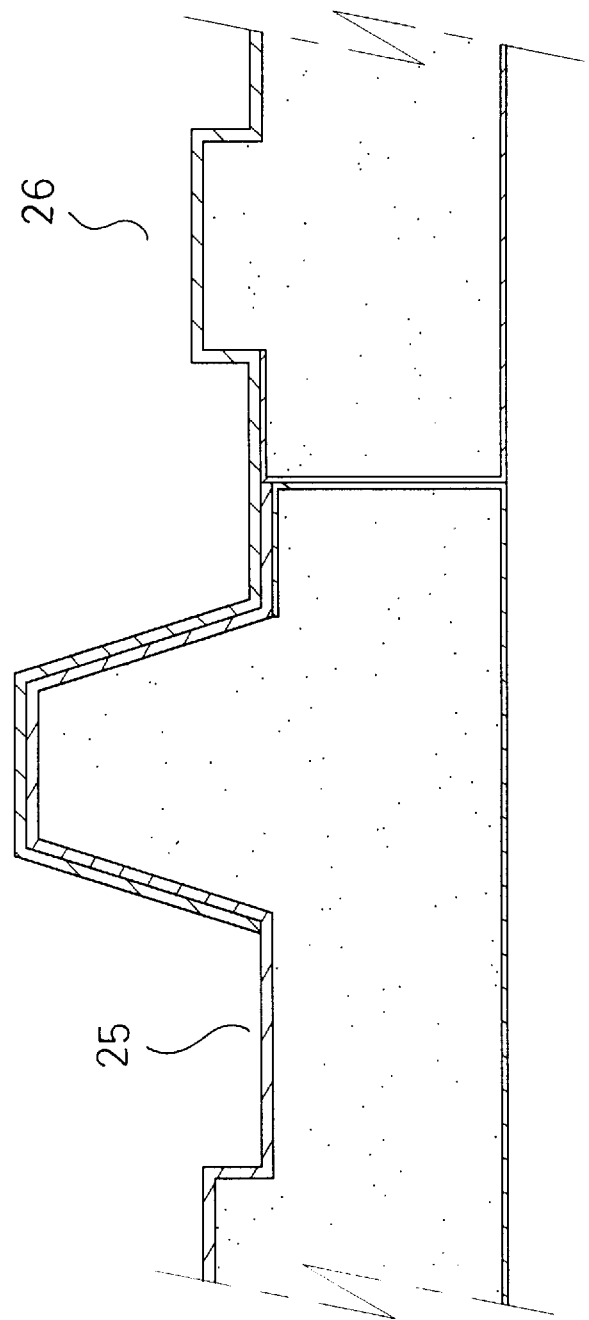
FIG. 7 is a sectional view showing the transverse connection of the corrugated board of the present invention.

Referring to FIGS. 4 and 5, the edge 23 of the high projection on one side and the edge 24 of one of the front and rear ends are free from any PU foam material 4 and PVC film 3, whereby two adjacent corrugated boards 25, 26 can be overlaid and connected in front, rear, left and right direction. Referring to FIGS. 6 and 7, after being connected, the bottoms of the two corrugated boards 25, 26 are tightly associated to achieve a good leakproof effect.

The above embodiment are only some examples of the present invention and the scope of the present invention should not be limited to the examples. Any modification or variation derived from the examples should fall within the scope of the present invention.

What is claimed is:

1. A corrugated board structure comprising an upper layer of corrugated board, a bottom layer and a middle layer of foam, the middle layer of foam adhering the upper and bottom layers tightly to each other as an integral body, the upper corrugated board being formed with projections with oblique opposite sides defining flutes therebetween, the bottom layer having opposite lateral edges each having an inverted L-shaped upright folded wall with a first leg of the L-shape extending perpendicularly from the bottom layer and a second leg of the L-shape having a distal end, and an inclined side extending obliquely from the distal end of the second leg of one of the upright folded walls, the upright folded walls restricting the foam between the upper and bottom layers whereby a lower edge on one side and a lower edge of one of the front and rear ends are free from any foam and bottom layer.

2. The corrugated board structure as claimed in claim 1, wherein the upper corrugated board is formed by one material selected from the group of materials consisting of PVC, PC, PP film and steel sheet.

3. The corrugated board structure as claimed in claim 1, wherein the bottom layer is formed by one material selected from the group of materials consisting of PVC film, PP film, nylon film and wooden fiber skin.

* * * * *